United States Patent
Kiraly et al.

(10) Patent No.: US 11,397,622 B2
(45) Date of Patent: Jul. 26, 2022

(54) MANAGED COMPUTING RESOURCE PLACEMENT AS A SERVICE FOR DEDICATED HOSTS

(71) Applicant: Amazon Technologies, Inc., Seattle, WA (US)

(72) Inventors: Bret Kiraly, Lake Forest Park, WA (US); Diwakar Gupta, Seattle, WA (US); Shane Ashley Hall, Kirkland, WA (US); Johannes Stephanus Jansen Van Rensburg, Seattle, WA (US); Christopher Sam Goosen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 16/429,728

(22) Filed: Jun. 3, 2019

(65) Prior Publication Data
US 2020/0379818 A1    Dec. 3, 2020

(51) Int. Cl.
*G06F 9/455* (2018.01)
*G06F 9/50* (2006.01)
*G06F 9/451* (2018.01)

(52) U.S. Cl.
CPC ............ *G06F 9/5077* (2013.01); *G06F 9/451* (2018.02); *G06F 9/45558* (2013.01);
(Continued)

(58) Field of Classification Search
CPC ...... G06F 9/5077; G06F 9/5072; G06F 9/451; G06F 9/45558; G06F 2009/45595; G06F 2009/45575
See application file for complete search history.

(56) References Cited

U.S. PATENT DOCUMENTS 9,448,820 B1   9/2016  Alexander
9,471,352 B1  10/2016  Mostert et al.
(Continued)

FOREIGN PATENT DOCUMENTS

WO   2014/182894 A2   11/2014
WO   2018/217387 A1   11/2018

OTHER PUBLICATIONS

Afshin Majd et al., Unpublished U.S. Appl. No. 16/457,334, filed Jun. 28, 2019, entitled "Power Supply Shedding for Power Efficiency Optimization", 33 pages.
(Continued)

*Primary Examiner* — Dong U Kim
(74) *Attorney, Agent, or Firm* — Nicholson De Vos Webster & Elliott LLP

(57) ABSTRACT

Techniques are described for enabling users of a service provider to manage placement preferences used to launch virtualized computing resources into a fleet of dedicated physical servers. Users can use one or more service provider interfaces to provide input indicating various placement preferences associated with a fleet of physical servers dedicated for use by a user of the service provider. These placement preferences can be used to determine at which physical server virtualized computing resources—for example, virtual machine (VM) instances, containers, and the like—are launched in response to launch requests. Among other benefits, the ability to configure customized placement preferences enables users to better satisfy various performance, reliability, software licensing, and other considerations users may have with respect to how their resources are placed within physical server fleets.

20 Claims, 8 Drawing Sheets

(52) U.S. Cl.
CPC .. *G06F 9/5072* (2013.01); *G06F 2009/45575* (2013.01); *G06F 2009/45595* (2013.01)

(56) References Cited

U.S. PATENT DOCUMENTS

| | | | |
|---|---|---|---|
| 9,874,924 | B1 | 1/2018 | Li |
| 10,211,630 | B1 | 2/2019 | Clidaras et al. |
| 2012/0005675 | A1 | 1/2012 | De Waal |
| 2012/0072762 | A1 | 3/2012 | Atchison et al. |
| 2013/0014101 | A1 | 1/2013 | Ballani et al. |
| 2014/0059207 | A1* | 2/2014 | Gulati .................. G06F 9/5077 709/224 |
| 2014/0277784 | A1 | 9/2014 | Mick et al. |
| 2015/0113144 | A1* | 4/2015 | Bauer ................ H04L 41/0873 709/226 |
| 2015/0199215 | A1 | 7/2015 | Mankovskii et al. |
| 2015/0227397 | A1 | 8/2015 | Gogula et al. |
| 2016/0043968 | A1* | 2/2016 | Jacob .................... G06F 9/5061 709/226 |
| 2017/0046206 | A1 | 2/2017 | Kofkin-Hansen et al. |
| 2017/0139729 | A1* | 5/2017 | Cropper .............. G06F 9/45558 |
| 2018/0032361 | A1 | 2/2018 | Manickam et al. |
| 2021/0089376 | A1 | 3/2021 | Glade et al. |

OTHER PUBLICATIONS

International Search Report and Written Opinion, PCT App. No. PCT/US2020/034896, dated Sep. 10, 2020, 14 pages.
Amazon Web Services, Inc., "Working with Dedicated Hosts", Amazon Elastic Cloud Compute, Available Online: https://docs.aws.amazon.com/AWSEC2/latest/UserGuide/how-dedicated-hosts-work.html#dedicated-hosts-understanding, May 16, 2019, 17 pages.
Non-Final Office Action, U.S. Appl. No. 16/799,582, dated Sep. 2, 2021, 49 pages.
International Preliminary Report on Patentability, PCT App. No. PCT/US2020/034896, dated Dec. 16, 2021, 9 pages.

* cited by examiner

MANAGED COMPUTING RESOURCE PLACEMENT AS A SERVICE FOR DEDICATED HOSTS

BACKGROUND

Many companies and other organizations operate computer networks that interconnect numerous computing systems to support their operations. For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
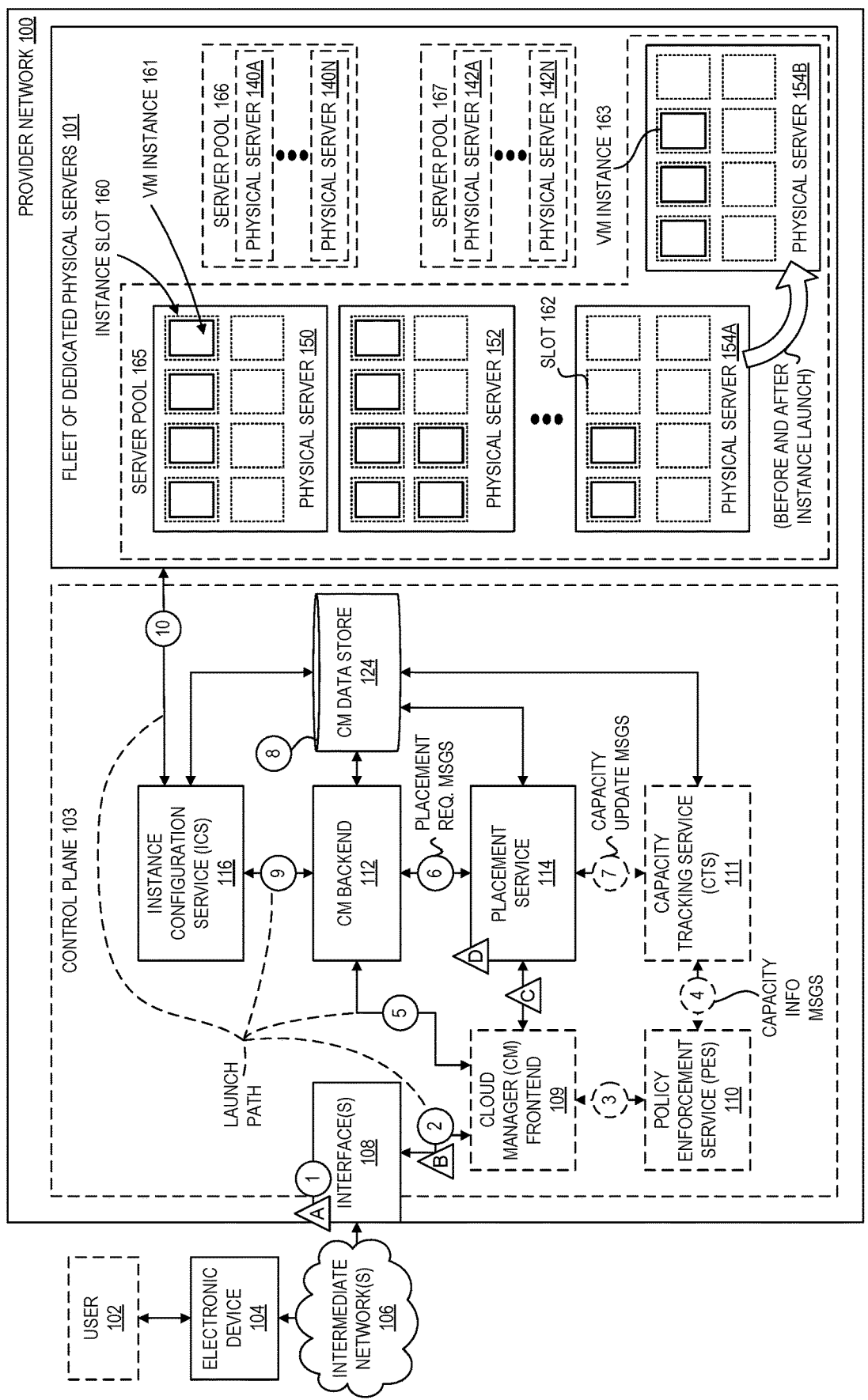
FIG. 1 is a diagram illustrating an environment that enables users of a service provider to configure customized placement rules used to place virtualized computing resources into fleets of dedicated physical servers according to some embodiments.

The present disclosure generally relates to methods, apparatus, systems, and non-transitory computer-readable storage media for enabling users of a service provider to manage placement preferences used to launch virtualized computing resources into a fleet of dedicated physical servers. According to embodiments described herein, users can use one or more service provider interfaces to provide input indicating various placement preferences associated with a fleet of physical servers dedicated for use by a user of the service provider. These placement preferences can be used to determine at which physical server virtualized computing resources—for example, virtual machine (VM) instances, containers, and the like—are launched in response to launch requests. Among other benefits, giving a user the ability to configure customized placement preferences can enable the user to better satisfy various performance, reliability, software licensing, and other considerations that the user may have with respect to how virtualized resources are placed within physical server fleets.

Service providers of virtualization technologies and other services often maintain fleets of computer systems and other equipment that form the infrastructure (for example, physical computer systems, networking systems, storage systems) on which to host virtualized computing resources and other services. In many cases, users can make use of such virtualization technologies with little awareness of the underlying physical hardware supporting their virtualized computing resources. Furthermore, users may often have little to no awareness of, or visibility into, the factors that influence placement of their virtualized computing resources on particular physical hardware.

In some cases, however, a user desires the ability to have greater control over the physical hardware upon which the user's virtualized computing resources are hosted. For this reason, some service providers enable users to provision and use so-called dedicated hosts. A dedicated host is a physical server managed by a service provider and having an amount of capacity for hosting virtualized computing resources—for example, virtual machine (VM) instances, containers, and the like—that is dedicated entirely for use by an individual user or a defined set of users (for example, users of an organization) of a multi-tenant provider network. These dedicated physical servers are typically housed within one or more of the service provider's data centers; however, in some cases, the physical servers can be housed in a user's on-premises data center(s) and remotely managed by a service provider. The dedication of entire physical servers to a single user or set of users may help such users better manage use of physical server-bound software licenses and address various corporate compliance and regulatory requirements, among other possible reasons some users might desire such control.

When launching new virtualized computing resources onto non-dedicated computer systems (that is, computer systems which may be shared among multiple users of a service provider), the service provider may provide users some control over how such resources are placed into the server provider-managed infrastructure. One example way in which a service provider may provide such control is with the creation of so-called "placement groups" into which compute instances or other types of resources can be launched. A user might configure a placement group, for example, to use one or more of the following placement strategies when launching new compute instances: cluster instances into one or more low-latency groups (for example, onto one or more physical servers with high-speed interconnectivity); partition or spread instances across logical partitions, ensuring that instances in one partition do not share underlying hardware with instances in other partitions; or spread instances across underlying hardware. In addition to these optional, user-configurable placement settings, a service provider typically applies various internal placement rules and processes to manage overall fleet health, improve capacity availability, and spread load within the multi-tenant provider network. These placement decisions made by the service provider can often have a significant effect on resource utilization, power consumption, licensing costs, and other aspects of managing the data centers that support the service provider's infrastructure.

For users of dedicated hosts, however, in part because the users are more directly responsible for the underlying hardware, many of the placement options described above for non-dedicated computer systems are not available. Instead, when a user launches a new virtualized computing resource into a fleet of dedicated hosts, the user may have only limited placement options such as, for example, the option to launch the resource onto a specific dedicated host that is identified by the user as part of the launch request (for example, by Internet Protocol (IP) address or other identifier), or to allow the service provider to place the resource automatically (that is, to place the resource at any suitable, possibly randomly-selected host from the user's fleet). Users thus may have little control over where their virtualized computing resources are placed upon launch if the user cannot identify a specific host before requesting the launch. Furthermore, users typically lack ready access to information about their fleets that would enable users to intelligently make custom placement decisions as part of new launch requests.

According to embodiments described herein, to provide users with more control over the placement of virtualized computing resources into dedicated host fleets, a service provider provides various interfaces that enable users to configure placement preferences to be applied as part of the service provider's resource launch path. In general, such user-specified preferences can be defined in relation to various properties associated with resource launch requests (for example, depending on a type of resource being launched, user-configurable tags associated with the resource, whether the resource is associated with any software licenses, and so forth) and indications of how a user desires for resources to be placed based on specific launch properties. The types of configurable placement preferences can include optional preferences exposed by the service provider, as well as other more customized placement preferences designed by users of the service provider.

FIG. 1 is a diagram illustrating an environment that enables users of a service provider to configure customized placement rules used to place virtualized computing resources into fleets of dedicated physical servers according to some embodiments. A user 102 operates an electronic device 104 or configures the electronic device 104 for communications with the provider network 100. The electronic device 104 communicates with the provider network 100 via one or more intermediate networks 106, such as the internet. As described above, a provider network provides users with the ability to use one or more of a variety of types of computing-related resources such as compute resources (for example, executing virtual machines (VMs) and/or containers, executing batch jobs, executing code without provisioning servers), data/storage resources (for example, object storage, block-level storage, data archival storage, databases and database tables, and so forth), network-related resources (for example, configuring virtual networks including groups of compute resources, content delivery networks (CDNs), Domain Name Service (DNS)), application resources (for example, databases, application build/deployment services), access policies or roles, identity policies or roles, machine images, routers and other data processing resources, and so forth. These and other computing resources may be provided as services, such as a hardware virtualization service that can execute compute instances, a storage service that can store data objects, and so forth. The users (or "customers") of multi-tenant provider networks 100 may utilize one or more user accounts that are associated with a customer account, though these terms may be used somewhat interchangeably depending upon the context of use.

To provide these and other computing resource services, provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

A user can use an interface of the provider network 100 create and configure at least one fleet 101 of dedicated physical servers to support execution of such virtualized computing resources. As indicated above, a dedicated host or physical server generally represents a server with compute instance capacity that is fully dedicated for use by an individual user or defined set of users of the multi-tenant provider network 100. The physical servers in the fleet 101 of dedicated physical servers can be computer systems of various configurations that differ along one or more dimensions, such as number and type of processors, type and amount of memory, connectivity of the memory to the processor(s), number and type of network interfaces, number and type of local storage devices (e.g., solid-state drives), number and type of hardware accelerators (e.g., graphics processing units), etc. In large-scale networks, there may be hundreds, thousands, or more physical servers, which may be located in multiple geographic locations.

In some embodiments, users can further group dedicated hosts into logically separate pools (for example, a server pool 165 including a physical server 150, a physical server 152, and a physical server 153; a server pool 166 including physical servers 140A-140N; and a server pool 167 including physical servers 142A-142N). As described elsewhere herein, placement preferences configured by a user optionally can be associated with a user's entire fleet of dedicated physical servers, and/or associated with one or more pools of servers within the fleet, where different server pools may be associated with different sets of placement preferences. For example, a user can create one pool of physical servers associated with launch preferences that cause resources to be clustered together based on software-license affinity rules, another pool that spreads launched resources across the hardware as much as possible, and so forth. Thus, in some embodiments, a different set of placement preferences, or combination of placement preferences, can be applied depending on a specified fleet or server pool associated with a launch request.

Aspects of enabling users to manage placement preferences for fleets of dedicated physical servers are described for the provider network 100 with reference to an exemplary set of events and operations, described with references to the triangles labeled "A" through "D" in FIG. 1. Furthermore, the launch of a compute instance within the fleet 101 (specifically, a launch that ultimately places a VM instance onto a physical server 154 based in part on applying a user's configured VM placement preferences) is described with reference to encircled numbers "1" through "10" of FIG. 1. In this example, a user is requesting to launch a particular type of compute instance, although the processes described herein can be applied to other types of virtualized computing resources (for example, containers, database instances, storage resources, and so forth).

The state of the example fleet 101 prior to the described placement preference configuration and instance launch is now described. The fleet 101 includes, but is not limited to, a server pool 165 including physical servers 150, 152, and 154 (shown before and after a launch as 154A and 154B). Prior to any operations associated with the described compute instance launch, the state of the physical servers 150, 152, and 154A is as follows: physical server 150 is hosting several VM instances, including VM instance 161 in a VM instance slot 160. Similarly, physical servers 152 and 154 are shown currently hosting other VM instances in VM instance slots, where each server has some number of unused instance slots representing an amount of unused compute capacity of the server. Note that the fleet 101 may include physical servers with different amounts of capacity, and support for different types and sizes of virtualization computing resources. Further note that VM slots (for example, the VM instance slot 160) illustrated within the electronic devices 150, 152, and 154A may be logical representations of portions of capacity managed by a control plane 103 of the provider network 100. The electronic devices 150, 152, and 154A may or may not have a local concept of a slot and execute instances based on received configuration and launch instructions, as described below.

At the triangle labeled "A," a user sends one or more messages to request the configuration of one or more placement preferences to be associated with the fleet of dedicated physical servers, or with one or more pools of physical servers within a fleet of dedicated physical servers. Communications between the electronic device 104 and the provider network 100, such as the request specifying the one or more placement preferences, can be routed through interface(s) 108, such as through use of application programming interface (API) calls, via a console implemented as a website or application, and so forth. The interface(s) 108 may be part of, or serve as a frontend to, a control plane 103 of the provider network 100 that includes "backend" services supporting and enabling the services that may be more directly offered to customers, such as services that enable the ability of users to configure placement preferences and to launch instances within the fleet 101. In addition to serving as a frontend to control plane services, the interface(s) 108 can perform operations such as verifying the identity and permissions of the user initiating a request, evaluating the request and routing it to the appropriate control plane services, and so forth.

As indicated above, in general, the placement preferences specified by a user generally provide an indication of how a user desires for virtualized computing resources to be placed onto particular physical servers in response to requests to launch the resources. For example, and as described in more detail hereinafter, a user might prefer that VM instances requiring a particular type of server-bound software license be clustered together on as few physical servers as possible within the user's fleet (for example, to minimize license costs), prefer that particular types of VM instances are clustered together for low-latency and other performance reasons, or prefer that other types of VM instances are spread across physical servers for redundancy purposes, or prefer other types of preferences or combinations thereof.

In some embodiments, one type placement preference that a user can specify involves the creation of placement groups for their fleet of dedicated physical servers. As indicated above in the context of non-dedicated hosts, the creation of a placement group generally allows users to indicate whether they want instances launched into a placement group to be placed together into a low-latency group (for example, for performance reasons) or spread out across physical servers in the fleet (for example, for redundancy reasons). A user can create a placement group for a fleet of dedicated physical servers, for example, using a GUI or other interface provided by provider network 100 that presents options for configuring the placement group. A placement group created by a user can be identified at the time a user requests that a virtualized computing resource be launched, as described below in reference to the example launch process.

As another example, a placement preference specified by a user can indicate that a user desires for as many of the physical servers in a fleet of physical servers to remain empty (that is, in a state such that no available instance slots are used). In other words, a user may desire for some resources to be placed onto as few physical servers as possible, filling servers to capacity before utilizing slots on other physical servers in the fleet. A user might desire to minimize a number of physical servers used, for example, so that the user has the option to downsize the total number of servers in the fleet or to repurpose some portion of servers in the fleet. As another option, a placement preference can instead indicate that a user desires for resources to be placed on physical servers with the most unused capacity, such that load on the available servers is spread out to the greatest extent possible.

In some embodiments, users can specify placement preferences that account for a current amount of load placed on various physical servers within a fleet over time. For example, a placement rule may seek to place resources on instances that currently do not exceed some specified threshold amount of load, or on instances that are associated with a relatively low load. The definition of load on the user's physical servers can be defined by the user, for example, defined in terms of CPU utilization, memory utilization, I/O load, or based on any other metric or combination thereof, and based on any desired thresholds that may impact a corresponding placement decision.

In some embodiments, users can specify placement preferences indicating a desire to cluster instances that are associated with a common software license. For example, if a user has resources that are associated with one or more server-bound software licenses, it may be most cost effective for the user if those resources to be placed on as few separate physical servers as possible, subject to any other placement preferences that the user may have specified (for example, in terms of spreading instances across servers for redundancy purposes). An indication of whether a resource is associated with one or more particular software licenses can be indicated as part of a launch request or derived from other data associated with a launch request.

In some embodiments, users can specify placement preferences that are based on indications of how particular resources are being used once launched. For example, a user might be responsible for managing a large software application that includes various intercommunicating subsystems or services, where those subsystems or services are spread across separately deployed instances. In this example, a user might prefer for instances associated with two or more of the subsystems to be clustered together to enable low-latency communication between the subsystems, while spreading the placement of instances associated with like subsystems for redundancy purposes, and so forth. Indications of a subsystem or service to which a launch request relates can be specified in the launch request, determined based on tags or other metadata associated with a machine image, or specified using other techniques. In some embodiments, users can similarly specify one or more placement preferences that cause certain resources to maintain proximity with one or more specified networked components with which the user's resources interact (for example, a centralized database or other resource).

In some embodiments, some or all of a user's specified placement preferences can be associated with corresponding weights indicating a relative importance of each of the preferences in the placement determination. For example, if a user has specified one placement preference related to clustering resources to minimize software license usage and has also specified a second preference for maintaining an amount of redundancy across servers, the user can weight each of those preferences depending on a relative importance of each preference to the user. In other embodiments, users can provide a ranked prioritization of placement preferences relative to one another so that the preferences are applied in a specified order of importance to the user.

As indicated above, in some embodiments, whether a specified placement preference is to be applied to a particular instance launch, and whether an optional weighting to be applied to particular placement preferences, can depend on one or more properties associated with a resource launch request. For example, a defined placement preference for clustering instances associated with a software license can be associated with a relatively high weighting for resource launches associated with a tag or other indication that the associated resource requires the particular software license.

Thus, when evaluating candidate VM slots on physical servers, slots on servers already associated with the software license, and already executing other instances that require the same license, can be highly ranked compared to slots on servers that would require an additional license to be obtained. On the other hand, the placement process for launching a resource that does not require the software license may not apply the software license-related placement preference, or apply a low weight to the preference, while preferring one or more other preferences (for example, preferences associated with clustering resources for performance reasons or spreading the resources for redundancy purposes). As these examples illustrate, the placement decision generally can be based on any combination of (i) placement preferences specified by a user (and optional weights/prioritizations associated with each placement preference), (ii) properties associated with a launch request, and (iii) properties and state information associated with physical servers of a fleet of physical servers into which a resource is being launched.

In some embodiments, users can optionally designate one or more dedicated hosts within a fleet 101 as being on a retirement path. The designation of a host as being on a retirement path generally indicates that a user desires for the host to continue executing any existing instances but for the placement process to avoid selecting the host for launching any additional instances. For example, a user might designate a particular physical server in a fleet as being on a retirement path if the user desires to reduce the size of the fleet or repurpose one or more fleet servers. In some embodiments, a server designated as being on a retirement path can be automatically assigned a lowest possible ranking among candidate destinations for resource launches or otherwise scored such that the placement service avoids selection of the host for new instance launches, if possible.

In some embodiments, the same user-configurable placement preferences can be applied to new instance launches as well as to instance restarts or, in other embodiments, specific placement preferences can be configured and used for instance restarts. For example, upon restarting an existing instance within a fleet 101, one or more placement rules may be applied to determine whether the instance is to be placed again on the same physical server at which the instance previously ran (assuming sufficient capacity is still available), or whether the instance is to be launched at a different physical server based on updated conditions within the fleet or based on other preferences.

In some embodiments, a provider network 100 provides one or more graphical user interface (GUIs) that enable users to specify the various types of user-configurable placement preferences to be applied to the user's launch requests. For example, a GUI can include interface elements enabling a user to indicate what types of preferences are desired by the user, to specify weightings to be associated with one or more of the placement preferences (for example, using slider bars or other input mechanisms), to specify tags or other metadata associated with instance launches used to determine which placement preferences to apply for each launch, and so forth. In some embodiments, users may also provide input specifying custom code or other logic that the user has created to be executed as part of certain placement determinations. For example, a user can upload a script or other executable logic that can be used to generate a placement determination based on input indicating launch request properties and current system conditions, or a user may create code to be executed by another service of the provider network 100 that is invoked as part of the placement determination and that returns an indication of preferred servers within a fleet for launching resources, and so forth. In some embodiments, a GUI can also display data reflecting one or more historical placement determinations made by the service provider based on a user's provided placement preferences.

In some embodiments, users can update placement preferences over time, for example, in response to changing performance needs, system conditions, or other reasons. A user, for example, can use a GUI as described above to select a previously defined set of placement preferences, provide additional input specifying one or more modifications to the existing placement preferences (for example, by modifying associated weights, relative preference priorities, and so forth), remove or add placement preferences, or make other changes that can be saved as an updated set of placement preferences. In some embodiments, a set of defined placement preferences can be copied and applied to one or more other physical server pools or fleets of dedicated physical servers associated with a same or different user of a provider network 100.

Upon receiving user input specifying one or more placement preferences, in some embodiments, the interface(s) 108 sends one or more messages to the CM frontend 109, as indicated at the triangle labeled "B." The messages can include information identifying the user and the placement preferences specified by the user. In some embodiments, the CM frontend 109 offloads a portion of the operations associated with managing the provider network from the CM backend 112 to reduce the workload of the CM backend 112. In some embodiments, at the triangle "C," the CM frontend 109 sends messages indicating the placement preferences to the placement service 114. In other embodiments, the input specifying the placement preferences is sent directly to the placement service 114 via the interface(s) 108 without involving a CM frontend 109.

At the triangle "D," the placement service processes the messages and stores a representation of the user-specified placement preferences. The specified placement preferences, for example, may be stored in a data store (for example, a CM data store 124) in association with an identifier of the requesting user and further in association with an identifier of the relevant fleet or fleets of dedicated physical servers (or one or more defined pools of servers within a fleet of dedicated physical servers). In some embodiments, the stored placement preferences can be represented as a weighted decision-matrix, or other data representation that enables the placement service 114 to rank candidate slots at the physical servers, as described herein in relation to an example placement request.

As indicated above, aspects of launching a virtualized computing resource are described for the provider network 100, with reference to an exemplary set of events and operations associated with the launch of a VM instance within the fleet 101, with reference to encircled numbers "1" through "10" of FIG. 1. At circle "1," the user uses an electronic device 104 to send one or more messages to the provider network 100 to request the launch of one or more instances. In the illustrated embodiment, a "launch path" includes the interface(s) 108, the CM frontend 109, the CM backend 112, and an instance configuration service (ICS) 116 (where some or all of these components may form at least a portion of a hardware virtualization service, in some embodiments). Each service in the launch path receives one or messages from one or more upstream entities (for example, the CM frontend 109 receives messages from the interface(s) 108, the interface(s) 108 receive messages from the electronic device 104, and so forth), performs one or more operations (for example, collecting or validating information), and sends one or more messages to a downstream entity (for example, the CM frontend 109 sends messages to the CM backend 112). The various components of the control plane 103 may be a set of distributed services or applications that facilitate operations as described herein. Other embodiments may combine or divide one or more of the control plane services (for example, combining the CM frontend 109 and CM backend 112, splitting out functionality of a service, and so forth).

In this example, the request to launch one or more virtualized computing resources is a request to launch one or more VM instances into the fleet of dedicated physical servers 101. The one or more messages sent by the electronic device 104 may further identify launch properties associated with each requested instance (for example, a number of CPU cores for each instance, amount of memory for each instance, and so forth) or may provide an identification of an instance type for each requested instance that identifies the one or more launch properties to the control plane.

In some embodiments, the launch properties associated with the request can further include "tag" information or other metadata identifying other various properties of the request. For example, one or more tags associated with a launch request can identify a type of resource being launch (for example, to identify an instance as a frontend application or a backend database service of a larger application system). As indicated, an identification of a type of instance being launched can be associated with particular placement preferences indicating a desire to cluster certain types of instances for latency purposes, or to spread other types of instances for redundancy purposes (for example, a set of database instances may be clustered with one or more other types of instances for low-latency, except for certain database instances tagged as "backups," which may be spread for redundancy purposes).

In some embodiments, launch properties can additionally or alternatively include information automatically derived from a machine image or other attribute of the request. For example, information such as an associated operating system, user applications, associated software licenses, and other instance properties may be automatically derived from a launch request or data associated with a launch request in some examples.

Upon receiving a message to launch an instance, the interface(s) 108 sends one or more messages to the CM frontend 109, as indicated at circle "2." The messages can include information identifying the requesting user and further identifying the type or parameters of the requested instance. As indicated above, in some embodiments, the CM frontend 109 offloads a portion of the operations associated with managing the provider network from the CM backend 112 to reduce the workload of the CM backend 112. In some embodiments, the CM backend 112 may be the only service able to write to the CM data store 124, which can serve as a single source of truth of the state of the provider network 100, and thus subject to a demanding workload. One such offloaded operation is verifying that the request to launch an instance can proceed along the launch path by checking with a policy enforcement service (PES) 110, as indicated at circle "3."

The PES 110 evaluates a launch request against one or more policies to determine whether the launch can proceed. Exemplary policies include checking the requesting user's creditworthiness, whether the user has any limits imposed on the number of instances they can launch, and whether the request might lead to resource shortages within the fleet 101. In the latter case, the PES 110 fetches capacity information from the capacity tracker service (CTS) 111, as indicated at circle "4." In some embodiments, the capacity information includes a number of available slots in a given fleet 101 or server pool (for example, the total number of available VM slots in the server pool 165) and a threshold at which the PES 110 should begin to limit the number of requests that are admitted. The PES 110 evaluates the launch request against the capacity information and, in some cases, may reject a launch request. In cases where the PES 110 rejects a request for capacity or other reasons, the CM frontend 109 and/or interface(s) 108 to provide an indication of the reason for failure to the customer. Otherwise, the PES 110 allows the launch request.

Assuming the PES 110 allows the request, at circle "5," the CM frontend 109 sends one or more messages to the CM backend 112 to continue the launch process associated with the VM instance request. The CM backend 112 may be responsible for updating a CM data store 124 that contains a state of the fleet 101 (for example, including state indicating available instance slots on each physical server, which instances are on which physical servers, the configurations of those instances, and so forth). Prior to being able to satisfy the launch request and update the state of the fleet 101, the CM backend 112 determines where within the fleet 101 to launch the requested instance. To make this placement determination, at circle "6," the CM backend 112 sends one or more messages to the placement service 114 to obtain placement information.

The placement service 114 evaluates the state of the fleet 101, the one or more launch properties associated with the launch (including an indication of the fleet or server pool for which the instance is destined), and any user-specified placement preferences to determine where to launch an instance. The fleet 101 may include numerous physical servers, each with varying properties and amounts of available capacity. As described in greater detail with reference to FIG. 2, the placement service 114 identifies a location for the requested instance by evaluating these various parameters. Upon making a placement determination, the placement service 114 returns placement information to the CM backend 112. Such placement information can include an identifier of the physical server within a host pool or fleet on which to launch the instance, and a slot identifier to logically track the usage of those resources within the fleet 101. In some embodiments, the placement service 114 also sends updated capacity usage information to the CTS 111, as indicated at circle "7," so that the CTS 111 can update its capacity information.

Note that in situations where a user has requested the launch of more than one instance and that request has proceeded to the CM backend 112, the CM backend 112 may serialize placement requests to the placement service 114 or the placement service 114 may serialize a received batch placement request from the CM backend 112.

For the example of the VM instance request in FIG. 1, the placement service 114 returns an identifier of physical server 154 and an identifier of slot 162 to the CM backend 112. As shown in physical server 154A (before launch), slot 162 is not occupied by an instance prior to the launch request. At circle "8," the CM backend 112 updates the CM data store 124 to indicate the instance will be launched on physical server 154. After updating the CM data store 124 to indicate that the instance will be launched on the physical server 154, the CM backend 112 sends one or more messages to the ICS 116 to configure and launch the instance, as indicated at circle "9."

The ICS 116 receives the instruction from the CM backend 112 to configure and launch an instance. The ICS 116 performs a workflow to configure and launch an instance according to one or more parameters, such as the compute, memory, network, storage, or other configuration settings. Those parameters may be received from the CM backend 112 or fetched based on one or more received identifiers that locate the parameters within the CM data store 124. The ICS 116 communicates with the physical server of the fleet 101 designated to host the instance, as indicated at circle "10," sending one or more messages to configure and launch the instance. For example, in some embodiments the ICS 116 may cause an offload card (which may include one or more processors, a local memory, physical network interfaces, and so forth) that is a part of (that is, coupled with) an electronic device of the fleet 101 to launch the compute instances. The offload card may implement a virtualization manager that can manage, for example, virtual machine compute instances that execute on a host electronic device, independent of a hypervisor or in combination with a hypervisor that executes using the traditional CPU(s) of the electronic device. For example, in some embodiments, the virtualization manager implemented by the offload card can instantiate and/or terminate virtual machines, thus eliminating the need for the hypervisor to perform these tasks, which can improve the performance of the virtual machines themselves due to not having to compete for resources with the hypervisor.

Alternatively, in some embodiments, the ICS 116 interacts with a hypervisor (for example, via a VM management server) to cause the compute instance(s) to be launched. In either case, the ICS 116 causes the physical server to create a virtual machine or other environment with the requested hardware configuration (for example, with access to a local solid-state drive, with two network interfaces, access to a local graphics accelerator, four cores, and 8 gigabytes of memory) and software configuration (executing a machine image that includes a Linux or other operating system, and so forth). Continuing the launch example in FIG. 1, the ICS 116 causes a VM instance 163 to be launched on physical server 154B (showing physical server 154A after launch).

Note that the environment illustrated in FIG. 1 shows one exemplary configuration of a launch path and associated control plane services. Other launch paths and control plane service configurations are possible. For example, the CM frontend 109 may request placement information from the placement service 114 and pass the obtained placement information to the CM backend 112, the CM frontend 109 and CM backend 112 can be combined, the placement service 114 and CTS 111 may access read replicas of the CM data store 124 rather than the same data store than the CM backend 112 is writing to, the CM backend 112 may make placement determinations in place of the placement service 114, and so forth. By enabling users to define custom placement preferences that are applied during the launch path, as described above, the provider network 100 is able to allow users significantly more control over the placement of instances into dedicated fleets of physical servers, among other benefits.

Figure 2:
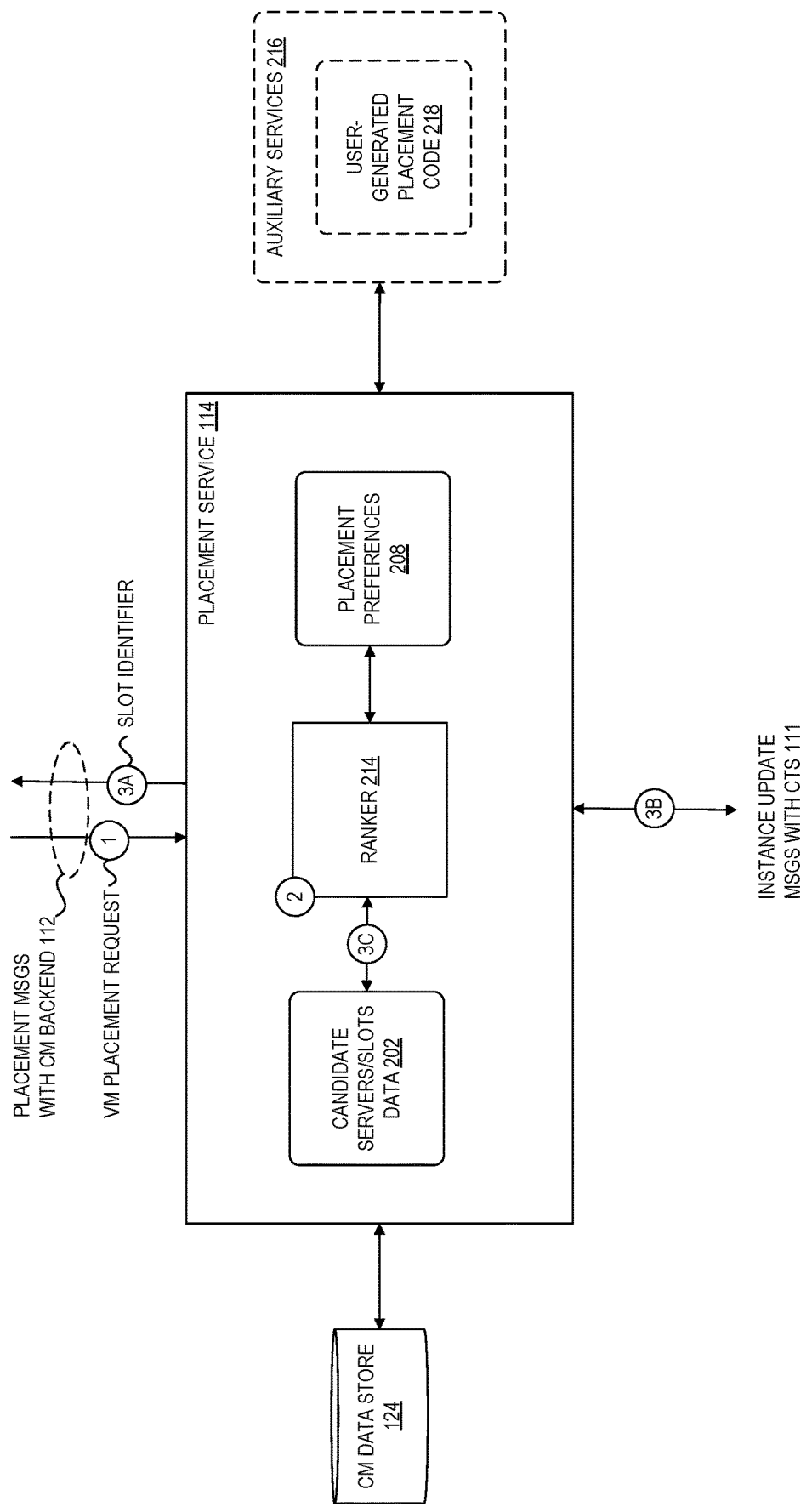
FIG. 2 is a diagram illustrating exemplary components and operation of a placement service in a provider network according to some embodiments.

FIG. 2 is a diagram illustrating exemplary operations and messaging involving a placement service that is configured to allow users to define customized placement rules used to place virtualized computing resources into fleets of dedicated physical servers in a provider network according to some embodiments. At a high level, the placement service 114 tracks the availability of slots at host instances and selects a slot in response to placement requests according to internal placement rules as well as any applicable user-specified placement preferences. As shown, the placement service 114 includes a candidate servers/slots data 202, a ranker 214, and placement preferences 208, which may be embodied as a set of instructions that are part of an application, service, or component, distributed or otherwise, of the placement service 114. An exemplary set of events and operations associated with the placement service 114 is described with reference to the encircled numbers "1" through "3" of FIG. 2.

To facilitate the selection of a slot to host an instance, candidate servers/slots data 302 is maintained and that identifies available slots for hosting instances, as well as various property information associated with each server and/or slot. For example, the property information can indicate resource information about each server, information about software licenses currently associated with various servers, property information associated with instances currently hosted by each server, and so forth. As described below, a ranker 214 evaluates the candidate servers/slots data in response to placement requests according to placement preferences 208.

In some embodiments, the candidate servers/slots data 202 identifies potential slots in part using a resource vector that identifies a set of resources in an instance-hosting physical server. An exemplary resource vector may represent compute and memory in a format <number of cores, amount of memory>. For example, assuming a slot on a physical server is allotted four-core processors and 8 gigabytes (GB) of memory, this capacity may be represented as <4, 8>. Note that the resource vector may extend to any number of dimensions. For example, if an instance-hosting electronic device includes one accelerator and two local disks, a resource vector in the form of <number of cores, amount of memory, accelerators, disks> may be <4, 8, 1, 2>. Other components may also rely on a resource vector as a data structure to exchange or obtain information about an instance. With reference to FIG. 1, the interface(s) 108 may translate a customer request for an instance into a resource vector that is passed down or referenced by other entities in the control plane 103, for example.

At circle "1," the placement service receives a placement request from the CM backend 112. In this example, the request is for a VM instance and is associated with one or more launch properties. In response to the request, the ranker 214 selects a slot from the candidate servers/slots data 202, as indicated at circle "2." The ranker 214 applies one or more placement preferences 208 to select a slot from the candidate servers/slots data 202, including any user-specified placement preferences associated with the fleet of servers into which the instance is being launched. Exemplary placement preferences filter and/or score candidate slots to select a slot to satisfy the request. As indicated above, the filtering and/or scoring of candidate slots based on user-specified placement preferences can include, but is not limited to, filtering and/or scoring candidate slots based on the association of certain physical servers with particular software licenses, based on the presence of other types of instances on certain servers, based on the performance characteristics of certain servers, and so forth. The selection of a slot can further be based on other factors that not specified by a user but rather based on criteria specified by the provider network 100. In some embodiments, the application of the placement preferences involves applying properties associated with a placement request, properties associated with candidate servers of a fleet, and possibly other system conditions as a weighted matrix calculation or other type of process that can rank available slots based on a weighted score generated for each available slot and/or physical server.

Once the ranker has selected a slot (for example, a slot with the highest ranking based on application of the placement preferences to the launch request properties), the placement service 114 returns an identification of the selected slot to the CM backend 112, as indicated at circle "3A" and, in some embodiments, further sends an indication that the slot has been (or will be) consumed to the CTS 111, as indicated at circle "3B."

As indicated at circle "3C," the ranker 214 performing the slot selection updates the candidate servers/slots data 202 to indicate that one of the slots in the candidate data was selected. Although not shown, the placement service 114 also performs operations in response to instance terminations. For example, the CM backend 112 can send a message to the placement service 114 that indicates an instance was terminated. In response to the indication, the placement service 114 can update the respective candidate servers/slots data 202 to include the slot.

As indicated above, in some embodiments, users may also provide custom code or other user-created logic that the user desires to be executed as part of the placement determination. For example, a user can create user-generated placement code 218 that is executed by the placement service 114, or executed by one or more auxiliary services 216 (for example, a hardware virtualization service, a container service, etc.) of a provider network 100 upon invocation of the code by the placement service 114. The user-generated placement code 218 can be configured to use input indicating launch request properties, available slot information, current system conditions, and possibly other parameters specific to a user's computing environment to rank available slots or servers according to custom logic. The placement service 114, for example, may provide an API that enables such user logic to obtain slot information, system properties, and possibly other information, and to send requests specifying placement determinations.

In some embodiments, a provider network 100 may provide one or more GUIs that enable users to view information related to how their placement preferences are being applied. For example, a user can access a GUI or other interface that provides an indication of the filters/weighted values that were applied to one or more launch requests and an indication of how those values resulted in the selection of a particular slot. In this manner, a user can better understand and diagnose issues related to placement decisions that may be made in ways unintended by the user.

Figure 3:
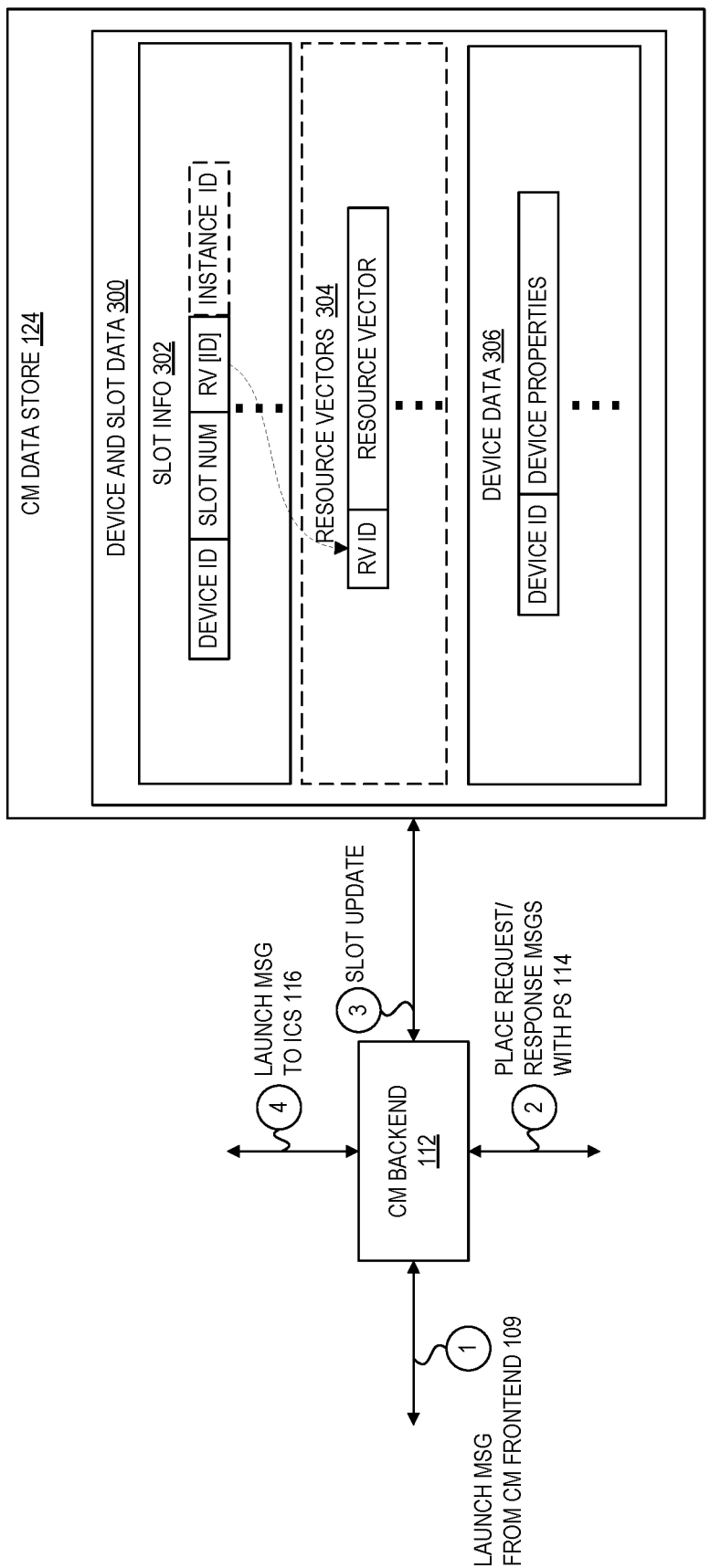
FIG. 3 is a diagram illustrating exemplary components and operations of a cloud manager backend service and exemplary data that can be used as part of placement processes in a provider network according to some embodiments.

FIG. 3 is a diagram illustrating exemplary operations and messaging involving a cloud manager backend service and exemplary data that can be used as part of capacity management in a provider network according to some embodiments. The right side of FIG. 3 illustrates exemplary data that can be used as part of capacity management in a provider network. In some embodiments, the CM data store 124 comprises a database that can be accessed—directly or indirectly—via one or more control plane entities. The CM data store 124 can include device and slot data 300, which can include one or more of a collection (or table) of slot info 302, resource vectors 304, and device data 306.

In some embodiments, each entry (or row, record, etc.) of the slot info 302 includes a physical server identifier (that uniquely identifies a particular host physical server within the provider network), and a slot number that is unique within the context of that physical server. For example, physical server 150 of FIG. 1 may have slot identifiers 0-7 to reflect each of its eight VM slots (regardless of whether they are used). Entries in slot info 302 may further include a resource vector or a resource vector identifier to directly or indirectly identify the resources used by the slot (for example, how much compute, memory, network, storage, or other capacity is allocated to that slot). Resource vector identifiers can be used to indirectly identify a resource vector in resource vectors 304, such as a resource vector that defines a particular instance type. In the case of occupied slots, an entry in slot info 302 may further include an instance identifier that uniquely identifies the instance occupying the slot. In some embodiments, the instance identifier may be encoded to indicate no instance is instantiated within the slot or a separate record in the entry may indicate whether the slot is occupied.

Thus, in various embodiments, this device and slot data 300 can be used to determine useful information for the operations described herein. For example, in some embodiments, the placement service 114 can determine candidates slots by fetching the slot numbers from the slot info 302 associated with an electronic device where the instance identifier or some other flag indicates no instance is occupying the slot.

An exemplary set of events and operations associated with the CM backend 112 is described with reference to the encircled numbers "1" through "4" of FIG. 3. At circle "1," the CM backend 112 receives one or more messages from the CM frontend 109 related to a requested launch of an instance. Such messages may include information about the sizing or requirements of the requested instance (e.g., a resource vector, parameters characterizing compute, network, memory, and other parameters) and various other launch properties. At circle "2," the CM backend 112 sends one or more messages to the placement service 114 to request placement information for the requested instance. Upon receipt of placement information that includes slot information, the CM backend 112 identifies the slot by checking the CM data store 124, as indicated at circle "3," and updates the corresponding slot info 302 accordingly. The CM backend 112 then sends one or more messages to the ICS 116 to launch the instance, indicated at circle "4."

For example, the placement service 114 may return placement information identifying slot 2 of physical server 154 in FIG. 1. Since slot 2 is unoccupied, the CM backend 112 updates the existing entry in the slot info 402 with an identifier of the launched instance.

Although the example in FIG. 1 illustrates the management and application of user-specified placement preferences for fleets of dedicated physical servers located at one or more service provider-managed data centers, the processes described herein can also be used in environments where some or all of the physical servers are located at one or more customer networks that are separate from the service provider networks.

Figure 4:
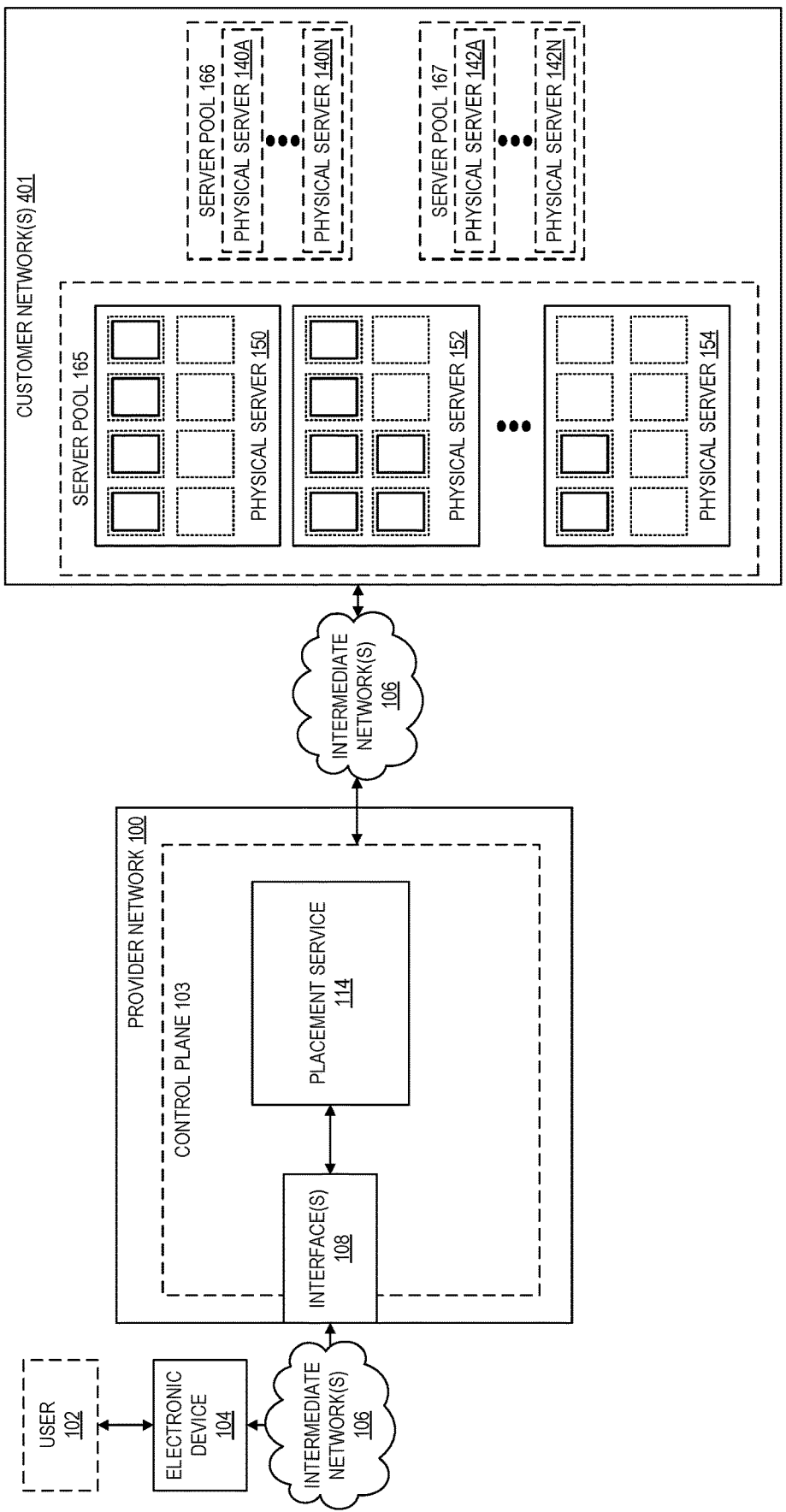
FIG. 4 is a diagram illustrating an environment that enables users to configure customized placement rules used to place virtualized computing resources into fleets of on-premises physical servers according to some embodiments.

FIG. 4 illustrates an example of an environment including a fleet of dedicated hosts housed at one or more remote customer network(s). As shown, a fleet of physical servers (for example, including physical servers 150-154) is located at one or more data centers or other locations within one or more customer networks 401 (or other edge location that is separate from the provider network 100). In some embodiments, a service provider offers services, infrastructure, and operating models to virtually any data center or other on-premises facility. In some examples, users can use the same APIs, tools, hardware, and the same functionality across on-premises and resources in a provider network 100 as a hybrid experience. For example, users might desire to use on-premises hardware to support workloads benefiting from low latency or local data processing needs, among other reasons. In some embodiments, the physical servers of the fleet may be purchased or otherwise obtained from the service provider and installed in a customer-managed network, or the physical servers may be obtained from other sources and configured to interface with the provider network 100.

In some embodiments, a provider network 100 enables users to manage the use of virtualized computing resources at the fleet of physical servers located within customer network 401 in much the same way as if the servers were housed at a data center managed by the service provider. For example, users can use interface(s) 108 to launch virtualized computing resources onto physical servers, to configure custom placement preferences, manage executing resources, among other operations. In this example, a user of the provider network 100 can have even more control over the physical hardware and infrastructure upon which virtualized computing resources execute, while making use of the control plane and other functionality provided by the provider network 100. Thus, similar to the example described in FIG. 1, a user can configure custom placement preferences that are applied by a placement service 114 when placing new resources onto the physical hardware located within customer network(s) 401 (or across the provider network 100 and customer network(s) 401).

Figure 5:
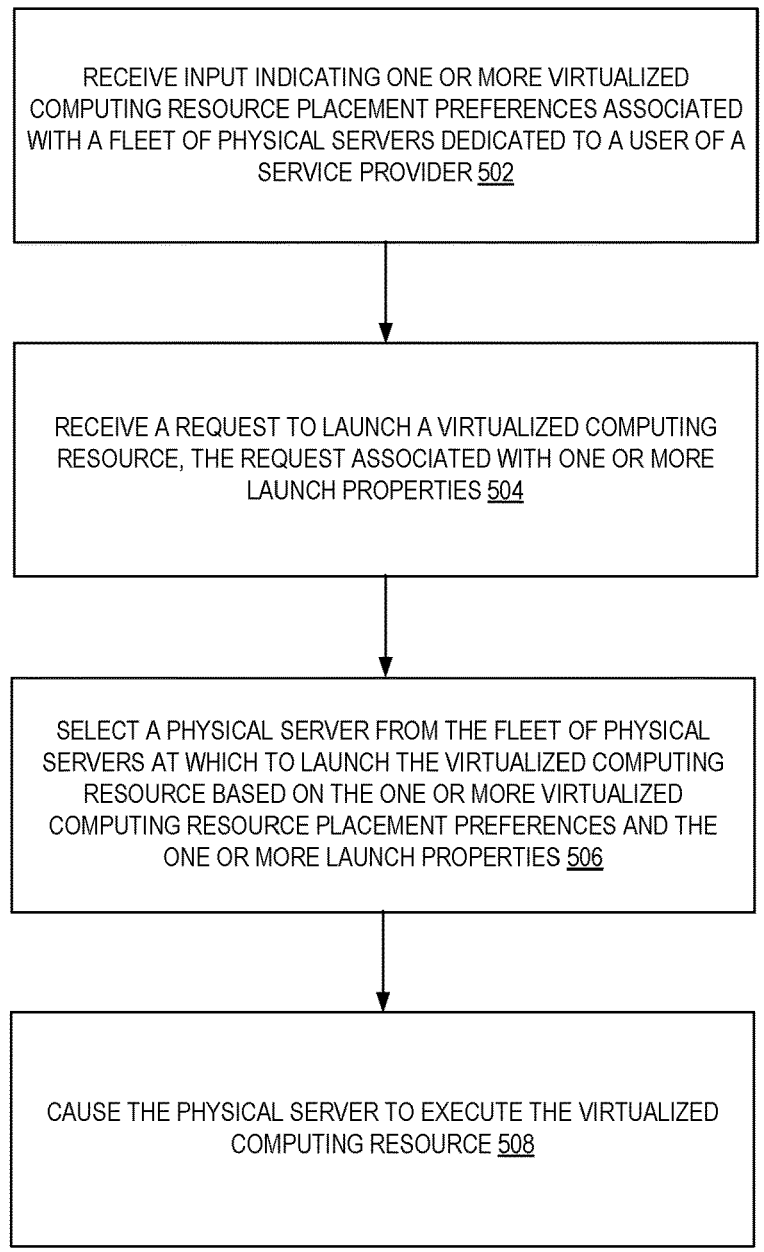
FIG. 5 is a flow diagram illustrating operations of a method for enabling users of a service provider to configure customized placement rules used to place virtualized computing resources into fleets of dedicated physical servers according to some embodiments.

FIG. 5 is a flow diagram illustrating operations 500 of a method for enabling users of a service provider to manage placement preferences used to launch virtualized computing resources into a fleet of dedicated physical servers according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by a placement service 114 of the other figures.

The operations 500 include, at block 502, receiving input indicating one or more virtualized computing resource placement preferences associated with a fleet of physical servers dedicated to a user of a service provider. Referring to FIG. 1, for example, a user 102 can provide input via interface(s) 108 indicating virtualized computing resource placement preferences associated with a fleet 101 of dedicated physical servers (or with a defined server pool within the fleet).

The operations 500 further include, at block 504, receiving a request to launch a virtualized computing resource, the request associated with one or more launch properties. For example, a launch request can be received via interface(s) 108, where the request is associated with one or more launch properties (for example, indicating a type of virtualized computing resource, resource requirements associated with the virtualized computing resource, one or more software licenses associated with the virtualized computing resource, one or more applications associated with the virtualized computing resource, or combinations thereof).

The operations 500 further include, at block 506, selecting a physical server from the fleet of physical servers at which to launch the virtualized computing resource based on the one or more virtualized computing resource placement preferences and the one or more launch properties. For example, a placement service 114 can select the physical server based on the placement preferences and the launch properties.

The operations 500 further include, at block 508, causing the physical server to execute the virtualized computing resource. For example, an ICS 116 can cause the selected physical server to execute the virtualized computing resource (physical server 154 in the example of FIG. 1).

In an embodiment, the operations further include receiving additional input indicating one or more modifications to the virtualized computing resource placement preferences; storing modified virtualized computing resource placement preferences based on the additional input; receiving a second request to launch a second virtualized computing resource into the fleet of physical servers, the second request associated with one or more second launch properties; selecting a second physical server for the second virtualized computing resource based on the modified virtualized computing resource placement preferences and the one or more second launch properties; and causing the physical server to execute the second virtualized computing resource.

In some embodiment, the input is first input, and wherein the fleet of physical servers comprises a first physical server pool including a first subset of physical servers of the fleet of physical servers, and the operations further include: receiving second input defining a second physical server pool including a second subset of physical servers of the fleet of physical servers; receiving third input indicating one or more virtualized computing resource placement preferences associated with the second physical server pool; receiving another request to launch a second virtualized computing resource into the second physical server pool; and selecting a second physical server from the second physical server pool based on the one or more virtualized computing resource placement preferences associated with the second physical server pool.

In some embodiments, at least one of the one or more virtualized computing resource placement preferences is associated with a corresponding weight, and wherein the computer-implemented method further comprises generating a weighted score for the physical server based at least in part on the one or more virtualized computing resource placement preferences associated with a corresponding weight, wherein the weighted score is used to select the physical server from the fleet of physical servers.

In some embodiments, the operations further include obtaining property information associated with physical servers of the fleet of physical servers, and wherein selecting the physical server is further based on property information associated with physical servers of the fleet of physical servers.

In some embodiments, the one or more virtualized computing resource placement preferences includes at least one of: a preference to cluster virtualized computing resources associated with particular launch properties, a preference to partition virtualized computing resources associated with particular launch properties across two or more logical partitions, or a preference to spread instances across the physical servers of the fleet of physical servers.

In some embodiments, at least one of the one or more virtualized computing resource placement preferences includes a preference to cluster virtualized computing resources based on a common software license associated with the virtualized computing resources.

In some embodiments, the one or more virtualized computing resource placement preferences include at least one of: a preference to minimize a number of physical servers of the fleet of physical servers executing a virtualized computing resource, or a preference to minimize a number of virtualized computing resources executing on each physical server of the fleet of physical servers.

In some embodiments, the input is first input, and the operations further include: receiving second input requesting to retire a particular physical server of the fleet of physical servers; and wherein selecting the physical server of the fleet of physical servers at which to launch the virtualized computing resource includes avoiding selection of the particular physical server.

In some embodiments, the one or more launch properties include an indication of one or more of: a type of virtualized computing resource, resource requirements associated with the virtualized computing resource, one or more software licenses associated with the virtualized computing resource, one or more applications associated with the virtualized computing resource.

In some embodiments, the operations further include causing display of a graphical user interface (GUI) including interface elements that enable a user to specify the one or more virtualized computing resource placement preferences; receiving the input via the interface elements of the GUI; and causing display of data reflecting one or more historical placement determinations.

In some embodiments, the input indicating the one or more virtualized computing resource placement preferences includes user-created placement code, and wherein selecting the physical server from the fleet of physical servers at which to launch the virtualized computing resource includes invoking execution of the user-created placement code, wherein the execution of the user-created placement code returns an indication of the physical server.

Figure 6:
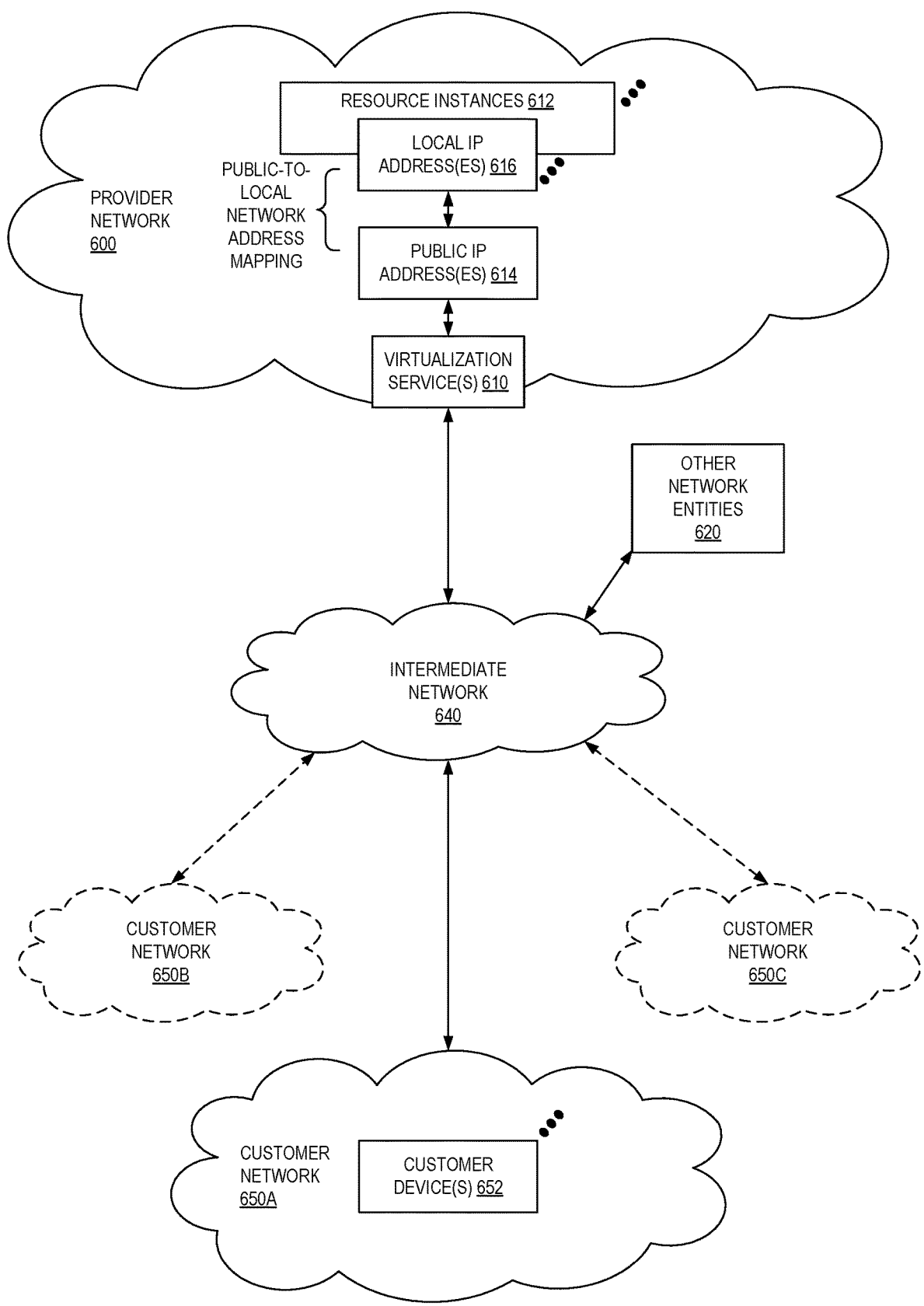
FIG. 6 illustrates an example provider network environment according to some embodiments.

FIG. 6 illustrates an example provider network (or "service provider system") environment according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates one or more client networks 650A-650C including one or more customer device(s) 652) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network(s) 650A-650C may, for example, implement customer-specific applications and present the customer's applications on an intermediate network 640, such as the Internet. Other network entities 620 on the intermediate network 640 may then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses. Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
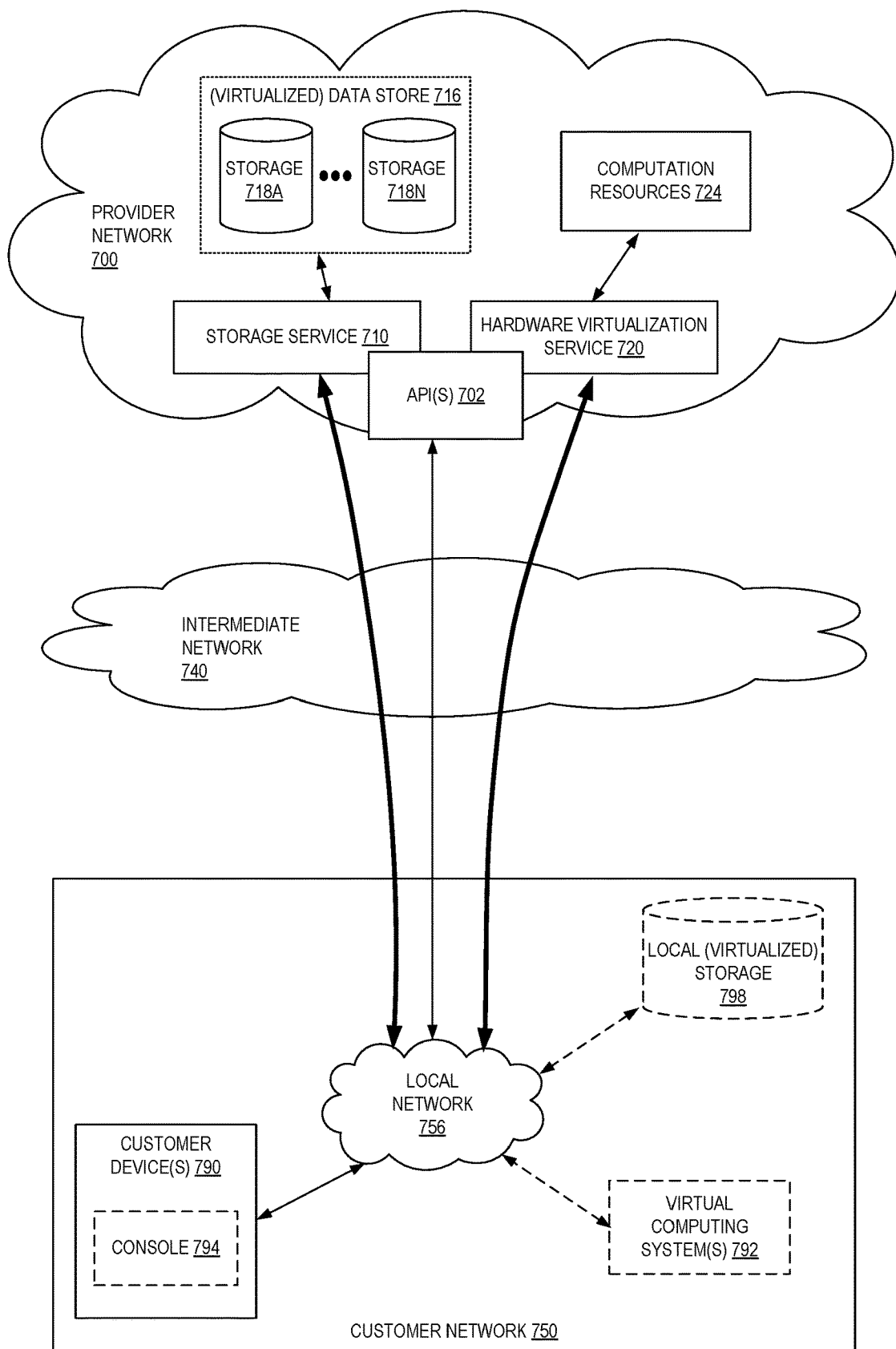
FIG. 7 is a block diagram of an example provider network that provides a storage service and a hardware virtualization service to users according to some embodiments.

FIG. 7 is a block diagram of an example provider network that provides a storage service and a hardware virtualization service to customers, according to some embodiments. Hardware virtualization service 720 provides multiple computation resources 724 (e.g., VMs) to customers. The computation resources 724 may, for example, be rented or leased to customers of the provider network 700 (e.g., to a customer that implements customer network 750). Each computation resource 724 may be provided with one or more local IP addresses. Provider network 700 may be configured to route packets from the local IP addresses of the computation resources 724 to public Internet destinations, and from public Internet sources to the local IP addresses of computation resources 724.

Provider network 700 may provide a customer network 750, for example coupled to intermediate network 740 via local network 756, the ability to implement virtual computing systems 792 via hardware virtualization service 720 coupled to intermediate network 740 and to provider network 700. In some embodiments, hardware virtualization service 720 may provide one or more APIs 702, for example a web services interface, via which a customer network 750 may access functionality provided by the hardware virtualization service 720, for example via a console 794 (e.g., a web-based application, standalone application, mobile application, etc.). In some embodiments, at the provider network 700, each virtual computing system 792 at customer network 750 may correspond to a computation resource 724 that is leased, rented, or otherwise provided to customer network 750.

From an instance of a virtual computing system 792 and/or another customer device 790 (e.g., via console 794), the customer may access the functionality of storage service 710, for example via one or more APIs 702, to access data from and store data to storage resources 718A-718N of a virtual data store 716 (e.g., a folder or "bucket", a virtualized volume, a database, etc.) provided by the provider network 700. In some embodiments, a virtualized data store gateway (not shown) may be provided at the customer network 750 that may locally cache at least some data, for example frequently-accessed or critical data, and that may communicate with storage service 710 via one or more communications channels to upload new or modified data from a local cache so that the primary store of data (virtualized data store 716) is maintained. In some embodiments, a user, via a virtual computing system 792 and/or on another customer device 790, may mount and access virtual data store 716 volumes via storage service 710 acting as a storage virtualization service, and these volumes may appear to the user as local (virtualized) storage 798.

While not shown in FIG. 7, the virtualization service(s) may also be accessed from resource instances within the provider network 700 via API(s) 702. For example, a customer, appliance service provider, or other entity may access a virtualization service from within a respective virtual network on the provider network 700 via an API 702 to request allocation of one or more resource instances within the virtual network or within another virtual network.

Figure 8:
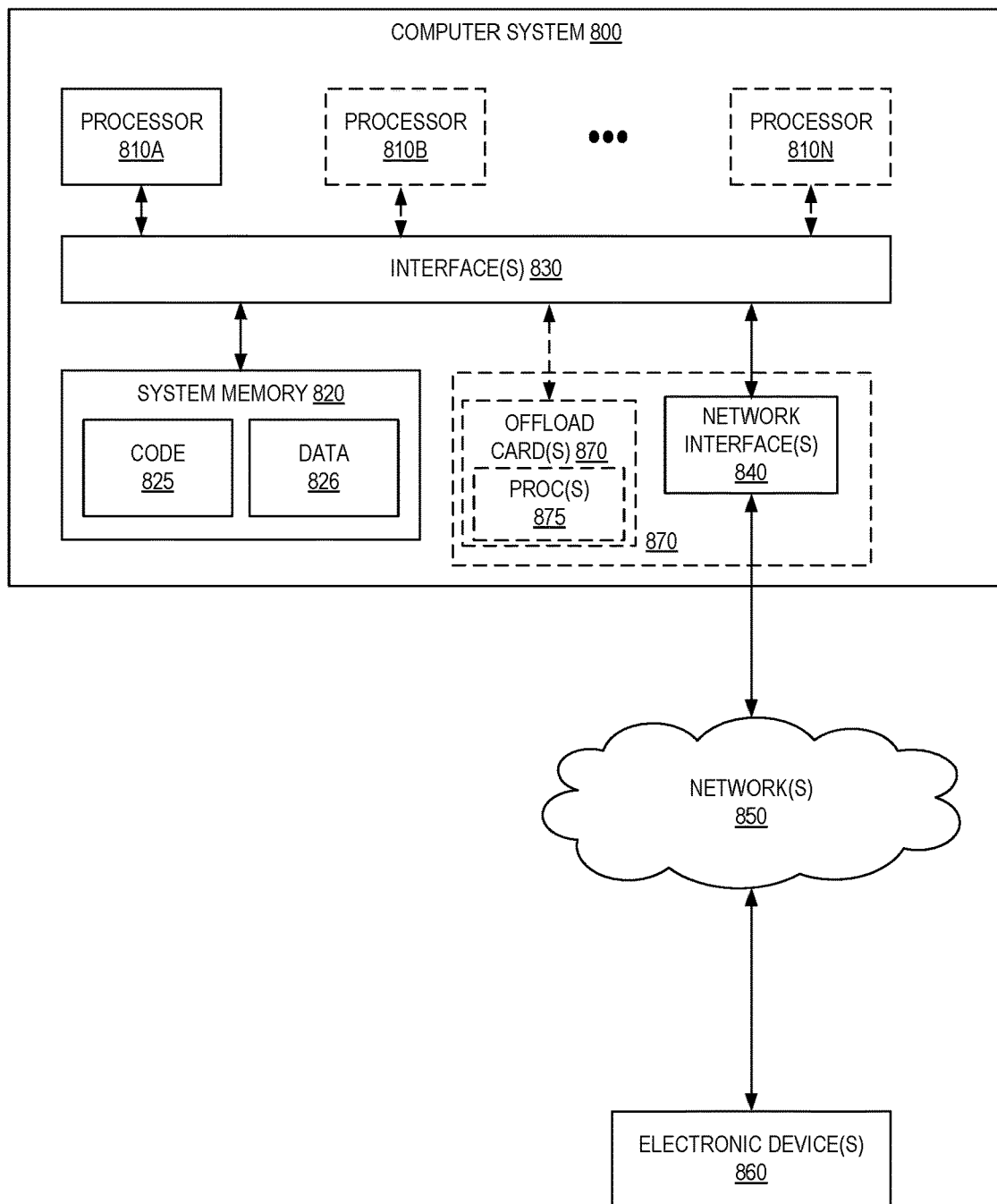
FIG. 8 is a block diagram illustrating an example computer system that may be used in some embodiments.

In some embodiments, a system that implements a portion or all of the techniques for enabling users of a service provider to manage placement preferences used to launch virtualized computing resources into a fleet of dedicated physical servers as described herein may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

System memory 820 may store instructions and data accessible by processor(s) 810. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850, such as other computer systems or devices as illustrated in FIG. 1, for example. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 800 includes one or more offload cards 870 (including one or more processors 875, and possibly including the one or more network interfaces 840) that are connected using an I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 800 may act as a host electronic device (e.g., operating as part of a hardware virtualization service) that hosts compute instances, and the one or more offload cards 870 execute a virtualization manager that can manage compute instances that execute on the host electronic device. As an example, in some embodiments the offload card(s) 870 can perform compute instance management operations such as pausing and/or un-pausing compute instances, launching and/or terminating compute instances, performing memory transfer/copying operations, etc. These management operations may, in some embodiments, be performed by the offload card(s) 870 in coordination with a hypervisor (e.g., upon a request from a hypervisor) that is executed by the other processors 810A-810N of the computer system 800. However, in some embodiments the virtualization manager implemented by the offload card(s) 870 can accommodate requests from other entities (e.g., from compute instances themselves), and may not coordinate with (or service) any separate hypervisor.

In some embodiments, system memory 820 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 718A-718N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, from a user of a cloud provider network comprising a fleet of physical servers available for virtual machines (VMs) of a plurality of users, a request to allocate a fleet of dedicated physical servers that are available only for VMs of the user or of users authorized by the user;
   configuring the fleet of dedicated physical servers to allow only the user or users authorized by the user to launch VMs into the fleet of dedicated physical servers;
   receiving input indicating one or more user-specified VM placement preferences to be applied to requests to launch VMs into the fleet of dedicated physical servers;
   wherein the one or more user-specified VM placement preferences comprises a user-specified VM placement preference to cluster VMs based on a common software license associated with VMs;
   storing the one or more user-specified VM placement preference as a property of the fleet of dedicated physical servers;
   receiving a request to launch a VM into the fleet of dedicated physical servers, the request associated with one or more launch properties;
   selecting a VM slot at a particular physical server for the VM from a set of candidate VM slots of the fleet of dedicated physical servers based on the one or more user-specified VM placement preferences and the one or more launch properties, wherein the VM slot represents an amount of unused compute capacity of the particular physical server;
   wherein selecting the VM slot is further based on the user-specified VM placement preference to cluster VMs based on the common software license associated with VMs; and
   causing the particular physical server to execute the VM.

2. The computer-implemented method of claim 1, further comprising:
   receiving additional input indicating one or more modifications to the one or more user-specified VM placement preferences;
   storing modified VM placement preferences based on the additional input;
   receiving a second request to launch a second VM into the fleet of dedicated physical servers, the second request associated with one or more second launch properties;
   selecting a second VM slot at a second particular physical server for the second VM from a second set of candidate VM slots at the one or more physical servers of the fleet of dedicated physical servers based on the modified VM placement preferences and the one or more second launch properties; and
   causing the second particular physical server to execute the second VM.

3. The computer-implemented method of claim 1, wherein the input is first input, and wherein the fleet of dedicated physical servers comprises a first physical server pool including a first subset of physical servers of the fleet of physical servers, the method further comprising:
   receiving second input defining a second physical server pool including a second subset of physical servers of the fleet of dedicated physical servers;
   receiving third input indicating one or more VM placement preferences associated with the second physical server pool;
   receiving a second request to launch a second VM into the second physical server pool; and
   selecting a VM slot for the second VM from a candidate set of VM slots at one or more physical servers of the second physical server pool based on the one or more VM placement preferences associated with the second physical server pool.

4. A computer-implemented method comprising:
   receiving, from a user of a cloud provider network comprising a fleet of physical servers available for virtualized computing resources of a plurality of users, a request to allocate a fleet of dedicated physical servers that are available only for virtualized computing resources of the user or of users authorized by the user;
   configuring the fleet of dedicated physical servers to allow only the user or users authorized by the user to launch virtualized computing resources into the fleet of dedicated physical servers;
   receiving input indicating one or more virtualized computing resource placement preferences to be applied to requests to launch virtualized computing resources into the fleet of dedicated physical servers;
   wherein the one or more virtualized computing resource placement preferences comprises a virtualized computing resource placement preference to cluster virtualized computing resources based on a common software license associated with virtualized computing resources;
   receiving a request to launch a virtualized computing resource into the fleet of dedicated physical servers, the request associated with one or more launch properties;
   selecting a physical server from the fleet of dedicated physical servers at which to launch the virtualized computing resource based on the one or more virtualized computing resource placement preferences and the one or more launch properties;
wherein selecting the physical server from the fleet of dedicated physical servers at which to launch the virtualized computing resource based on the one or more virtualized computing resources placement preferences comprises selecting the physical server from the fleet of dedicated physical servers at which to launch the virtualized computing resource based on the virtualized computing resource placement preference to cluster virtualized computing resources based on the common software license associated with virtualized computing resources; and
causing the physical server to execute the virtualized computing resource.

5. The computer-implemented method of claim 4, further comprising:
receiving additional input indicating one or more modifications to the virtualized computing resource placement preferences;
storing modified virtualized computing resource placement preferences based on the additional input;
receiving a second request to launch a second virtualized computing resource into the fleet of dedicated physical servers, the second request associated with one or more second launch properties;
selecting a second physical server for the second virtualized computing resource based on the modified virtualized computing resource placement preferences and the one or more second launch properties; and
causing the second physical server to execute the second virtualized computing resource.

6. The computer-implemented method of claim 4, wherein the input is first input, and wherein the fleet of physical servers comprises a first physical server pool including a first subset of physical servers of the fleet of physical servers, the method further comprising:
receiving second input defining a second physical server pool including a second subset of physical servers of the fleet of dedicated physical servers;
receiving third input indicating one or more virtualized computing resource placement preferences associated with the second physical server pool;
receiving a second request to launch a second virtualized computing resource into the second physical server pool; and
selecting a second physical server from the second physical server pool based on the one or more virtualized computing resource placement preferences associated with the second physical server pool.

7. The computer-implemented method of claim 4, wherein at least one of the one or more virtualized computing resource placement preferences is associated with a corresponding weight, and wherein the computer-implemented method further comprises generating a weighted score for the physical server based at least in part on the one or more virtualized computing resource placement preferences associated with a corresponding weight, wherein the weighted score is used to select the physical server from the fleet of dedicated physical servers.

8. The computer-implemented method of claim 4, further comprising obtaining property information associated with physical servers of the fleet of dedicated physical servers, and wherein selecting the physical server is further based on property information associated with physical servers of the fleet of dedicated physical servers.

9. The computer-implemented method of claim 4, wherein the one or more virtualized computing resource placement preferences includes at least one of: a preference to cluster virtualized computing resources associated with particular launch properties, a preference to partition virtualized computing resources associated with particular launch properties across two or more logical partitions, or a preference to spread instances across the physical servers of the fleet of dedicated physical servers.

10. The computer-implemented method of claim 4, wherein the one or more virtualized computing resource placement preferences include at least one of: a preference to minimize a number of physical servers of the fleet of dedicated physical servers executing a virtualized computing resource, or a preference to minimize a number of virtualized computing resources executing on each physical server of the fleet of dedicated physical servers.

11. The computer-implemented method of claim 4, wherein the input is first input, and wherein the method further comprises:
receiving second input requesting to retire a particular physical server of the fleet of dedicated physical servers; and
wherein selecting the physical server of the fleet of dedicated physical servers at which to launch the virtualized computing resource includes avoiding selection of the particular physical server.

12. The computer-implemented method of claim 4, wherein the one or more launch properties include an indication of one or more of: a type of virtualized computing resource, resource requirements associated with the virtualized computing resource, one or more software licenses associated with the virtualized computing resource, one or more applications associated with the virtualized computing resource.

13. The computer-implemented method of claim 4, further comprising:
causing display of a graphical user interface (GUI) including interface elements that enable a user to specify the one or more virtualized computing resource placement preferences;
receiving the input via the interface elements of the GUI; and
causing display of data reflecting one or more historical placement determinations.

14. The computer-implemented method of claim 4, wherein the input indicating the one or more virtualized computing resource placement preferences includes user-created placement code, and wherein selecting the physical server from the fleet of dedicated physical servers at which to launch the virtualized computing resource includes invoking execution of the user-created placement code, wherein the execution of the user-created placement code returns an indication of the physical server.

15. The computer-implemented method of claim 4, further comprising:
wherein the virtualized computing resource is associated with the common software license; and
wherein selecting the physical server from the fleet of dedicated physical servers at which to launch the virtualized computing resource based on the virtualized computing resource preference to cluster virtualized computing resources based on the common software license associated virtualized computing resources is based on determining that the physical server is executing one or more virtualized computing resources associated with the common software license.

16. A system comprising:
a fleet of physical servers that host virtual machines (VMs) of a plurality of users of a cloud provider network; and
a control plane service of a provider network implemented by one or more electronic devices, the control plane service including instructions that upon execution cause the control plane service to:
receive, from a user of the cloud provider network comprising the fleet of physical servers, a request to allocate a fleet of dedicated physical servers that are available only for VMs of the user or of users authorized by the user;
configure the fleet of dedicated physical servers to allow only the user or users authorized by the user to launch VMs into the fleet of dedicated physical servers;
receive input indicating one or more VM placement preferences to be applied to requests to launch VMs into the fleet of dedicated physical servers;
receive a request to launch a VM into the fleet of dedicated physical servers, the request associated with one or more launch properties;
wherein the one or more VM placement preferences is to comprise a VM placement preference to cluster VMs based on a common software license associated with VMs;
select a VM slot at a particular physical server for the VM from a set of candidate VM slots at one or more physical servers of the fleet of dedicated physical servers based on the one or more VM placement preferences and the one or more launch properties, wherein the VM slot represents an amount of unused compute capacity of a physical server of the fleet of physical servers;
wherein the instructions that upon execution cause the control plane service to select the VM slot at the particular physical server for the VM comprise instructions that upon execution cause the control plane service to select the VM slot at the particular physical server for the VM based on the VM placement preference to cluster VMs based on the common software license associated with VMs; and
cause the particular physical server to execute the VM.

17. The system of claim 16, wherein the instructions, upon execution, cause the control plane service to:
receive additional input indicating one or more modifications to the VM placement preferences;
store modified VM placement preferences based on the additional input;
receive a second request to launch a second virtualized computing resource into the fleet of dedicated physical servers, the second request associated with one or more second launch properties;
select a second particular physical server for the second virtualized computing resource based on the modified VM placement preferences and the one or more second launch properties; and
cause the second particular physical server to execute the second virtualized computing resource.

18. The system of claim 16, wherein the input is first input, and wherein the fleet of physical servers comprises a first physical server pool including a first subset of the physical servers of the fleet of physical servers, and wherein the instructions, upon execution, cause the control plane service to:
receive second input defining a second physical server pool including a second subset of the physical servers of the fleet of dedicated physical servers;
receive third input indicating one or more virtualized computing resource placement preferences associated with the second physical server pool;
receive a second request to launch a second virtualized computing resource into the second physical server pool; and
select a second physical server from the second physical server pool based on the one or more virtualized computing resource placement preferences associated with the second physical server pool.

19. The system of claim 16, wherein at least one of the one or more VM placement preferences is associated with a corresponding weight, and wherein the instructions, upon execution, cause the control plane service to generate a weighted score for the physical server based at least in part on the one or more VM placement preferences associated with a corresponding weight, wherein the weighted score is used to select the physical server from the fleet of dedicated physical servers.

20. The system of claim 16, wherein selecting the physical server is further based on property information associated with physical servers of the fleet of dedicated physical servers.

* * * * *